(No Model.) 2 Sheets—Sheet 2.

J. F. GUBBINS.
DRIER.

No. 536,336. Patented Mar. 26, 1895.

Witnesses:
Chas. E. Gaylord,
Lute D. Alter.

Inventor:
John F. Gubbins,
By Samuel E. Hibben
Atty.

UNITED STATES PATENT OFFICE.

JOHN F. GUBBINS, OF CHICAGO, ILLINOIS.

DRIER.

SPECIFICATION forming part of Letters Patent No. 536,336, dated March 26, 1895.

Application filed December 30, 1893. Serial No. 495,168. (No model.)

*To all whom it may concern:*

Be it known that I, JOHN F. GUBBINS, a citizen of the United States, residing at Chicago, in the county of Cook and State of Illinois, have invented certain new and useful Improvements in Driers, of which the following is a specification.

The object of my invention is to make a simple, efficient and economical drier for drying offal and refuse of all kinds from packing houses and blood and refuse from rendering tanks, and for the drying of brewers' grains, &c., the resulting product being utilized and used as a fertilizer or as a food for animals, depending upon the nature of the material treated.

To this end, I propose to construct a drier having the greatest amount of heating surface possible in proportion to its dimensions, and thereby provide a drying chamber which shall thoroughly and rapidly dry the material contained therein.

My drier possesses another advantageous feature, being what I term self-contained, in that the outer shell incases all the parts of the drier, so that the usual bricking in is rendered unnecessary. By a novel arrangement of a combustion chamber and return flue within this inclosing shell, I am enabled to utilize the flames, heated gases, &c., to their fullest extent, in addition to the securing of increased heating or drying surface; and, furthermore, by providing a perfect circulation of water or steam in the jacket surrounding the drying chamber, I secure other advantages, as will be hereinafter pointed out; and my invention consists in the features and details of construction hereinafter described and claimed.

Figure 1:
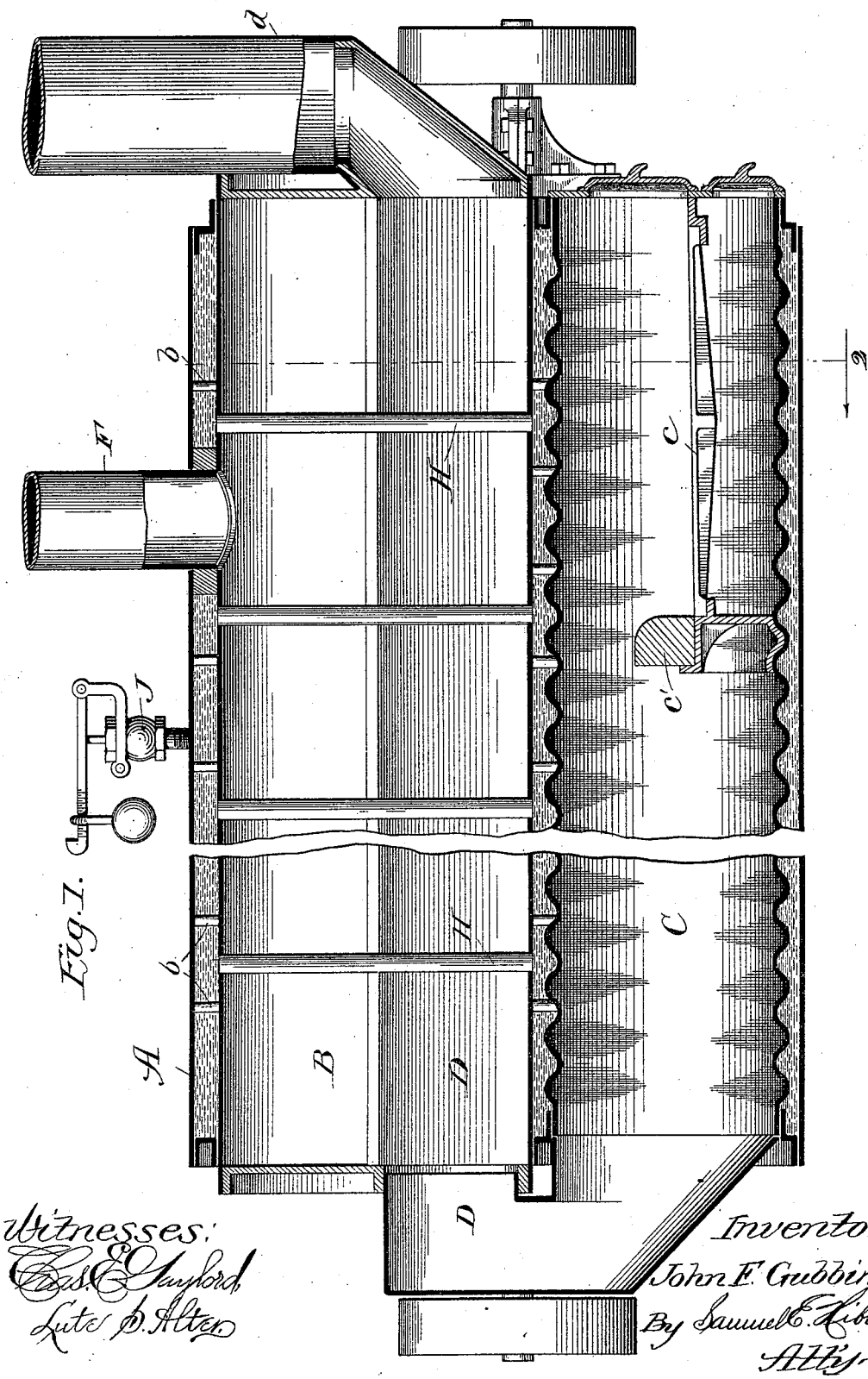
Figure 2:
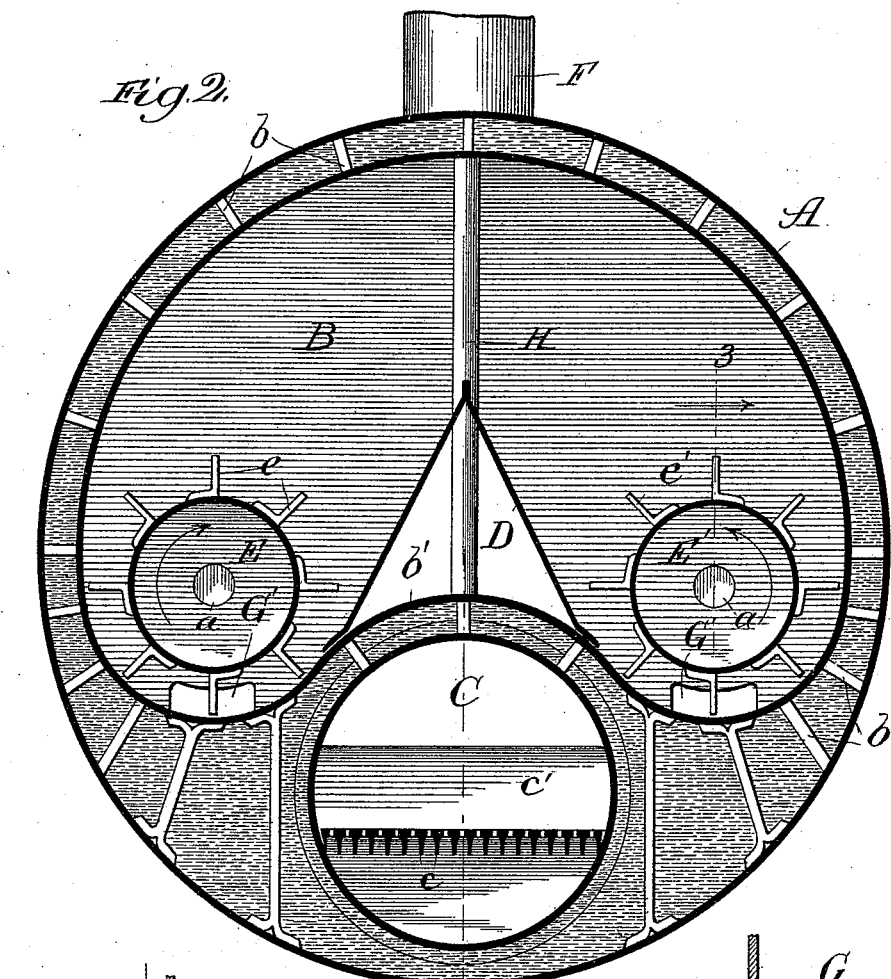
Figure 3:
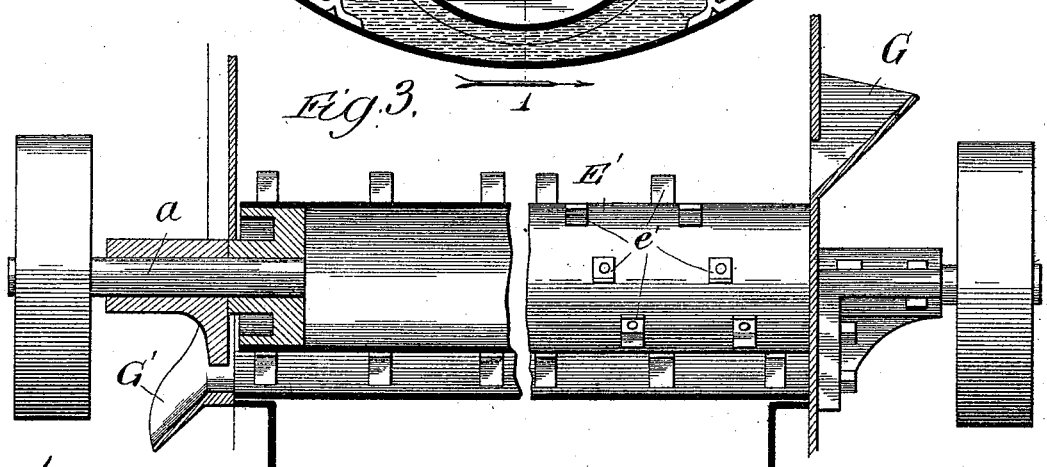

In the drawings, Figure 1 is a vertical longitudinal section of my drier taken through line 1 of Fig. 2; Fig. 2, a transverse section taken on line 2 of Fig. 1, and Fig. 3 a section taken through line 3 of Fig. 2.

In constructing my improved form of drier, I make an outer shell or casing, A, preferably of boiler iron, and of suitable dimensions. Supported within this shell in any suitable manner, as by ordinary stay bolts, $b$, is another casing, forming a chamber, B, to be hereinafter designated in the specification and claims as the "drying chamber," and in which the material to be dried is treated. This inner shell is likewise constructed preferably of boiler iron and of the required form and dimensions, and extends longitudinally through the interior of the outer shell. It is preferably heart-shaped in cross section, or substantially so, as shown in the drawings, and has a re-entrant portion, $b'$, although such shape is not essential to the successful operation of my drier, being simply a preferable construction adopted by me. It will be observed that this chamber contains ample drying space, which is especially advantageous, as hereinafter described, in facilitating the drying of material introduced therein. Preferably beneath this re-entrant portion of the drying chamber is arranged a combustion chamber, C, having the usual grate bars, $c$, and fire bridge, $c'$. This chamber may be constructed throughout of corrugated iron plate, as shown in the drawings, for the purpose of obtaining increased heating surface and to provide for differential expansion. However, it is obvious that the chamber may have any other form desired, as for instance, it may, for economical reasons or otherwise, be made entirely cylindrical, or a portion only cylindrical, and another portion corrugated or shaped in any other desired form. This chamber extends longitudinally through the interior of the outer shell and preferably below the drying chamber. The flue then returns or doubles upon itself, forming the return flue, D, which passes preferably through the entire length of the drying chamber. After passing therethrough, it communicates with an ordinary smoke flue or stack, $d$.

The return flue may be constructed in any suitable shape, and of any desired dimensions, depending somewhat upon the character of the material to be treated, and I therefore wish it understood that I do not intend to limit myself to the particular shape shown in the drawings. As shown, it consists essentially of two plates of iron secured to the bottom of the drying chamber and bolted together at their free ends, so that a flue substantially pyramidal in cross section is thereby formed.

Arranged near the bottom of the drying chamber, that is to say, in the depressions or lobes of the form shown in the drawings, are longitudinal agitator shafts, E E', which consist of plates of iron rolled into a long cylinder, and having gudgeons, a, at either end suitably journaled in the ends of the outer shell or casing. These shafts are provided upon their circumference or periphery with teeth, e, e', which are secured thereto in any suitable manner. As shown in the drawings, they are arranged spirally around the shaft, one slightly in advance of the other, so that the material in the drying chamber will not only be agitated but be fed toward the opposite end of the shaft. Through the top of the drying chamber, and passing likewise through the top of the outer shell, is a vapor ring or opening, F, to carry out the vapors and moisture from the drying chamber. At one end of my drier, I arrange suitable hoppers, G, in which the fresh material is introduced into the drying chamber, and at the opposite end of the drier is arranged delivery outlets, G', for the passage or delivery of the dried material.

It will be observed that there is formed around the drying chamber a steam or water jacket, although for the sake of brevity and clearness in description, I will hereinafter speak of the same in the specification and claims as a water jacket, without limiting myself.

In order to provide a perfect circulation of water and to prevent dead water pockets, I arrange any suitable number of tubes, H, extending from the base of the drying chamber to the top thereof, and forming a direct communication between the upper and lower portions of the water jacket. These tubes not only provide a better circulation in the water jacket and also impart heat to the chamber through which they pass, thereby still further increasing the drying surface, but they possess an additional purpose or advantage in that they serve to brace or stay the walls of the drying chamber. Motion may be transmitted to the agitator shafts by means of pulleys and belts, arranged at one or both ends of the shaft in the ordinary and well known manner. If desired, an exhaust fan (not shown) may be arranged above the vapor flue for exhausting the moist air from the drier, and thus facillitate the process of drying the contents. As shown in Fig. 1, any suitable safety valve J, communicating with the water jacket may be provided.

Having set forth the construction of my drier, I will now proceed to describe its operation.

Assuming that a fire in the furnace of the combustion chamber has heated the water within the jacket to a sufficiently high temperature, the material to be treated is fed through the hoppers upon one end of the rapidly rotating agitator shafts, by which it is disintegrated and thrown into the space above them, and thereby dried or partially so. Inasmuch as I prefer to rotate these shafts in opposite directions, it will be noticed that the particles of material thrown upward by one shaft will strike the particles thrown upward by the other shaft in the upper portion of the drying chamber whereby they will be disintegrated and suspended thereby exposing them on all sides to the action of the heated air. It is well known that substances are most thoroughly and effectually dried by constant and direct exposure to the air and having this fact in mind I have provided my drier with an enlarged drying chamber having ample air space above the agitators. By this construction the heated air will quickly absorb the moisture, &c., from the material treated and furthermore it will be impossible for the vapors and moisture to be again absorbed by the dried material in the drier after being once separated. After striking, the particles will, of course, fall upon the heated return flue and by this means the material is still further dried, and on account of the inclination of this flue, the material will slide downward by its own gravity and be again fed to the agitators, by which it is again projected into the air space. It is understood, of course, that on account of the peculiar set and arrangement of the teeth upon the shafts a steady forward movement is at the same time imparted to the material, so that at each revolution it is carried toward the delivery end of the drier, by which time it will have reached a sufficiently dry state.

The advantages of my form of drier will be readily apparent to those versed in the art to which this invention appertains. In the first instance, my drier is self-contained, being inclosed in one incasing shell and finished complete at the shop and ready for immediate use. The furnace and combustion chamber is entirely surrounded by water or other medium for heating the drier, so that all radiation of heat is fully absorbed, while the flames, heated gases, &c., seeking exit to the smoke flue are partially recovered and utilized by the return flue within the drying chamber, whereby the drying or heating surface thereof is materially increased. Furthermore, by means of an enlarged air space above a plurality of agitators, the process of drying the material is facilitated and the work most thoroughly performed. In short, my drier comprises advantages not attained by any other drier in point of economy of construction and operation.

If desired, my form of drier may be bricked in and a separate combustion chamber arranged beneath the outer shell, using the combustion chamber shown, as a return flue and the original return flue as a secondary one, or the orignal combustion chamber may be entirely dispensed with.

Although the drawings may indicate that the shafts are always to be rotated in opposite directions, yet I do not wish to be understood as limiting myself thereto, inasmuch as it is evident that the material may be supplied to and delivered from both ends of the drier, or that the material treated by one agitator shaft may be delivered to the other shaft to be still further treated before being passed out of the apparatus; and although I have shown and described more or less precise forms, I do not desire to be understood as limiting myself thereto, as I contemplate changes in form, proportion of parts and the substitution of equivalents, as circumstances may suggest or render expedient.

I claim—

1. In a drier, the combination of a closed drying chamber, an outer continuous shell or casing therearound and forming a water jacket therefor, shafts journaled substantially near the bottom of the chamber and provided with dodged teeth upon their circumference for triturating and agitating the material to be treated and means for heating the drying chamber, substantially as described.

2. In a drier, the combination of a drying chamber, an outer continuous shell or casing therearound and forming a water jacket therefor, an agitator shaft journaled substantially near the bottom of the drying chamber and a heating chamber extending longitudinally through the water jacket and beneath the drying chamber, substantially as described.

3. In a drier, the combination of a drying chamber substantially heart-shaped in cross section, agitator shafts arranged longitudinally in the lobes of the drying chamber and an independent heating chamber extending longitudinally beneath the re-entrant portion of the drying chamber, substantially as described.

4. In a drier, the combination of a drying chamber provided with inlet and outlet ports for the reception and delivery of the material to be treated, an outer shell or casing around the drying chamber and forming a water jacket therefor, shafts extending longitudinally through the drying chamber substantially near the bottom thereof, at least one of which shafts is arranged axially with the outlet port, and means for heating the drying chamber whereby the material introduced into the drier will be agitated and passed forward by the rotation of the shafts in the process of drying and delivered in a dried state at the outlet port, substantially as described.

5. In a drier, the combination of a drying chamber, a combustion chamber located adjacent to said drying chamber, a return flue communicating with the combustion chamber and passing longitudinally through the drying chamber, and an agitator shaft located substantially near the bottom of said drying chamber, substantially as described.

6. In a drier, the combination of an outer shell or casing, a drying chamber arranged therein, and an independent agitator shaft located substantially near the bottom of the drying chamber a combustion chamber extending longitudinally through the interior of the outer shell, and a return flue communicating with the combustion chamber and returning through the drying chamber, whereby the greatest drying surface is obtained, substantially as described.

7. In a drier, the combination of a drying chamber, a combustion chamber located below said drying chamber, a return flue communicating with the combustion chamber and passing longitudinally through the drying chamber along substantially the line of the central axis of the drying chamber, and agitator shafts located near the bottom of said drying chamber and on either side of said return flue, substantially as described.

8. In a drier, the combination of a drying chamber substantially heart-shaped in cross section, agitator shafts arranged in the lobes thereof, and heating tubes extending through said chamber from the re-entrant portion of the chamber to its top, substantially as described.

9. In a drier, the combination of a drying chamber, an agitator shaft rotatable therein and located near the bottom thereof, an outer shell enveloping the drying chamber and forming a jacket therefor and substantially vertical tubes H passing through said chamber and communicating between the upper and lower portions of the jacket, substantially as described.

10. In a drier, the combination of a drying chamber, a combustion chamber adjacent to said drying chamber, a return flue communicating with the combustion chamber and passing longitudinally through the drying chamber, and heating tubes passing through the drying chamber and return flue, substantially as described.

11. In a drier, the combination of an outer shell or casing, a drying chamber substantially heart-shaped in cross section and supported in said outer shell, a combustion chamber located below the re-entrant portion of said drying chamber, a return flue communicating with the combustion chamber and passing through the drying chamber above its re-entrant portion, and agitator shafts located in the lobes of the drying chamber and on either side of the return flue, substantially as described.

12. In a drier, the combination of a drying chamber substantially heart-shaped in cross section, an outer shell or casing therearound and forming a jacket therefor, a combustion chamber beneath the re-entrant portion of the drying chamber, a return flue communicating with the combustion chamber and passing longitudinally through the drying chamber, agitator shafts arranged in the lobes of said drying chamber and on either side of the return flue, and heating tubes passing through the drying chamber and return flue, and communicating directly between the upper and lower portions of said jacket, substantially as described.

13. In a drier, the combination of a drying chamber, a combustion chamber adjacent thereto, a return flue communicating with the combustion chamber and passing through the drying chamber, agitator shafts located on either side of said flue, and spirally arranged teeth secured to said shaft, whereby the material to be treated will be agitated and when dried will be passed out of the drying chamber, substantially as described.

JOHN F. GUBBINS.

Witnesses:
THOMAS F. SHERIDAN,
SAMUEL E. HIBBEN.